United States Patent [19]

Danelson et al.

[11] Patent Number: 4,545,471
[45] Date of Patent: Oct. 8, 1985

[54] DRIVE ASSEMBLY

[76] Inventors: Terry L. Danelson, Box 154 R33; Barry J. Harmon, Box 965, both of Scobey, Mont. 59623

[21] Appl. No.: 514,317

[22] Filed: Jul. 18, 1983

Related U.S. Application Data

[63] Continuation-in-part of Ser. No. 386,014, Jun. 7, 1982.

[51] Int. Cl.⁴ .................. A01B 39/19; F16D 11/00
[52] U.S. Cl. .................... 192/67 R; 464/37; 172/44; 172/311; 172/456; 172/698; 403/229; 192/67 P
[58] Field of Search ............... 192/67 R, 62, DIG. 2, 192/67 P, 89 R; 464/37, 38, 39, 57, 901, 147, 185; 172/44, 698, 311, 456; 403/229

[56] References Cited

U.S. PATENT DOCUMENTS

| | | | |
|---|---|---|---|
| 1,565,211 | 12/1925 | Seymour | 464/57 X |
| 2,254,566 | 9/1941 | Cornell, Jr. | 464/57 |
| 2,398,385 | 4/1946 | Mintkeu | 464/57 |
| 2,514,394 | 7/1950 | Irving | 464/57 |
| 2,528,270 | 10/1950 | Fundingsland | 192/67 R X |
| 2,603,137 | 7/1952 | Fundingsland | 192/67 R X |
| 2,680,383 | 6/1954 | Lahti | 464/57 X |
| 2,699,714 | 1/1955 | Fundingsland | 172/44 |
| 3,186,494 | 6/1965 | Jackson | 172/44 |
| 3,211,485 | 10/1965 | Petersen | 464/57 X |
| 3,702,639 | 11/1972 | Womble et al. | 192/67 R X |
| 4,180,990 | 1/1980 | Hill | 464/37 |
| 4,397,358 | 8/1983 | Handy | 172/44 |
| 4,409,780 | 10/1983 | Beougher et al. | 172/456 X |

FOREIGN PATENT DOCUMENTS

| | | | |
|---|---|---|---|
| 0181470 | 3/1955 | Austria | 192/67 R |
| 0608364 | 9/1960 | Italy | 192/67 R |
| 0753947 | 8/1956 | United Kingdom | 464/37 |
| 0719525 | 3/1980 | U.S.S.R. | 172/311 |

Primary Examiner—Rodney H. Bonck
Assistant Examiner—David D. House
Attorney, Agent, or Firm—Arthur L. Urban

[57] ABSTRACT

A drive assembly including first and second shafts, the shafts being normally aligned axially in an end to end relationship, a connector portion operatively connecting adjacent ends of the first and second shafts, the connector portion including a resilient section extending between the adjacent ends of the first and second shafts, a first end section extending from one end of the resilient section, the first end section including an axial opening, the adjacent end of the first shaft engaging and being affixed within the first end section opening, a second end section extending from the opposite end of the resilient section, the second end section including an axial opening, the adjacent end of the second shaft engaging and being affixed within the second end section opening; whereby the connector portion provides a flexible positive drive connection between the first and second shafts. Also, a separable drive assembly including a coupling portion with a rod point section extending from one end of the above connector portion and a guide section with an axial bore slidably engageable with the rod point section.

3 Claims, 4 Drawing Figures

U.S. Patent    Oct. 8, 1985    4,545,471
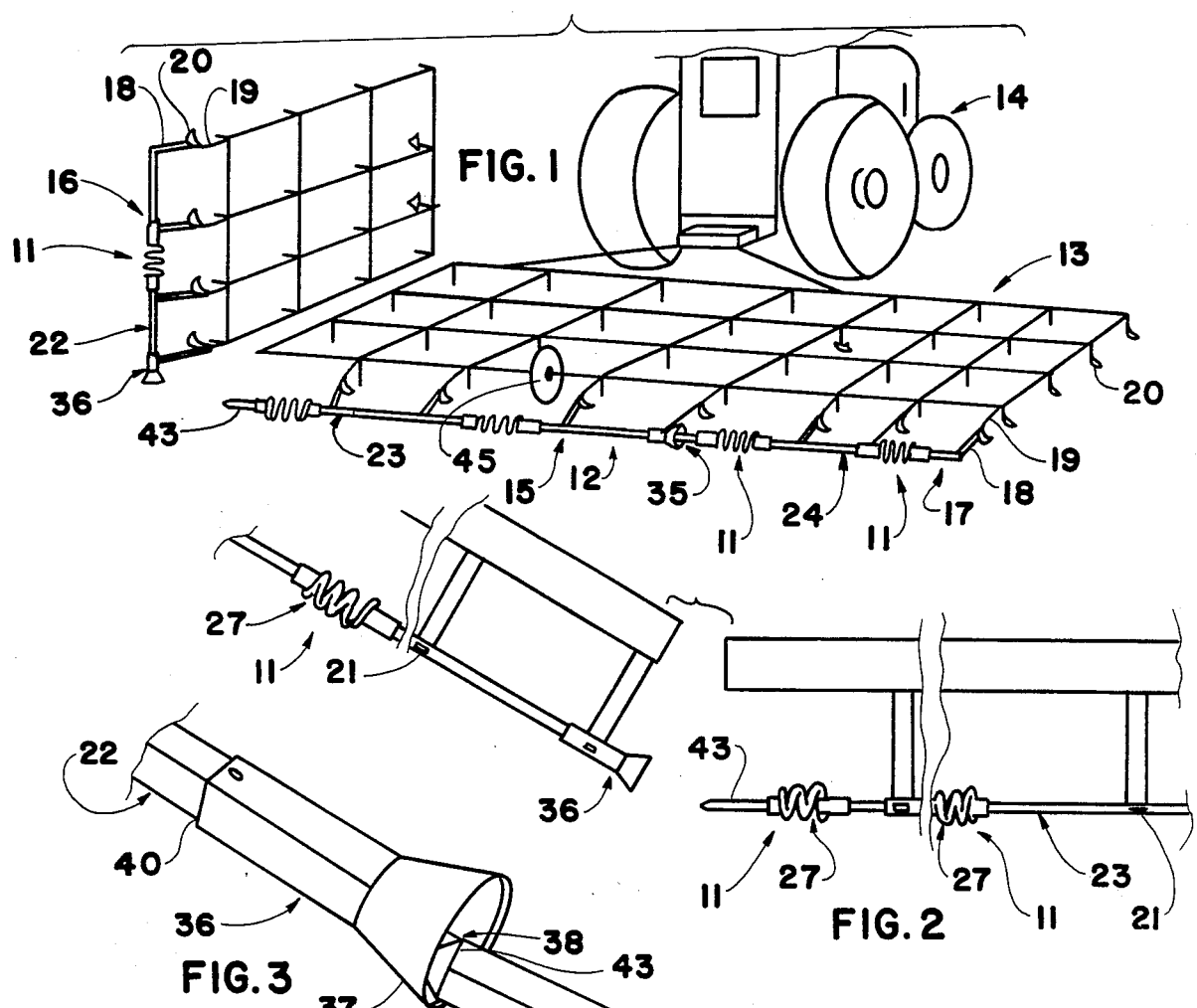
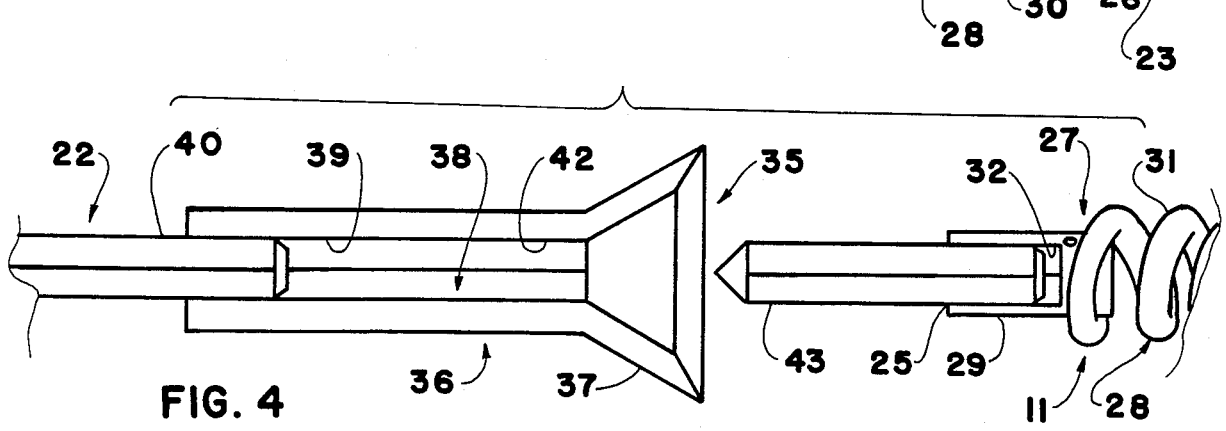

DRIVE ASSEMBLY

This application is a continuation-in-part of pending application Ser. No. 386,014, filed June 7, 1982.

This invention relates to a novel drive assembly and more particularly relates to a drive assembly that can be separated.

Since the development of power sources such as water wheels, windmills, engines, motors and the like, there has been the problem of utilizing the power generated efficiently. Such devices generally have an output shaft which rotates at a high rate of speed. To utilize the power, it is necessary to connect a power consuming mechanism to the output shaft. This ordinarily requires some type of coupling arrangement.

One common coupling is the combination of pulleys and a belt. A pulley is mounted on the power source output shaft and a second pulley on an input shaft of the mechanism to be driven. An endless belt is looped over the pulleys and tensioned. If desired, sprockets can be substituted for the pulleys and a chain for the belt to achieve a positive interconnection of the components.

While the use of pulleys and belts or sprockets and chains provides useful drive arrangements in some situations, they are not without problems. The two shafts must be aligned parallel to but displaced from one another. Also, uncoupling of the two shafts may not be accomplished conveniently.

Another drive arrangement which is employed frequently where the shafts are axially aligned is the direct connection of the shafts through a sleeve connector. This arrangement requires that the two shafts be accurately aligned prior to coupling.

To couple two shafts which cannot be accurately aligned or in which the alignment changes during use, it is common to employ a universal joint. Universal joints provide flexibility of the coupling during rotation of the shafts.

Although the above coupling arrangements are satisfactory in some drive situations, they are not suitable in all cases. One deficiency that they have in common is that they generally require coupling by hand. Thus, these expedients are less than desirable in drive arrangements that require frequent coupling and uncoupling.

This is particularly true in situations in which an operator is positioned remote from the drive mechanism. One such use is in farm machinery. Frequently, the machinery is so large that the operator is positioned at a considerable distance from the drive mechanism. For example, the operator may be located in the driver's seat of a tractor, while the drive connection may be located at the rear of the tractor close to the ground at a point beyond the reach of the operator.

With other equipment, the drive connection may be on machinery being driven by the tractor. An example of such a drive connection can be found in rod weeder attachments. Such rod weeders ordinarily are used in combination with plowing apparatus that is drawn by the tractor.

The plowing apparatus ordinarily includes a wide framework with a large number of spaced chisel plows mounted thereon. This enables a farmer to plow and weed a wide area with each pass over a field. By reducing the number of passes over a field, a farmer saves considerable time and fuel.

While it is desirable to cover a large area with each pass, the use of very wide equipment of thirty or forty feet or more in width can present serious problems. Transfer of the equipment from one field to another can be difficult. Gates between fields generally are less than twenty feet in width.

In order to get the equipment through the gates, the equipment generally is constructed with one or more pivoting outrigger sections. These outrigger sections may swing upwardly or horizontally to decrease the overall width of the apparatus and thus allow the equipment to pass through the gate. The same problem is encountered when it is necessary to move the equipment along a road or lane.

Rod weeders generally employ some type of drive mechanism to rotate the rods. One alternative is to employ separate drive mechanisms for the outrigger rod sections as well as for the main section. Another arrangement is to couple the outrigger sections to the main section during use. This coupling ordinarily is accomplished through the use of universal joints.

While both of these expedients provide satisfactory results, they are not considered to be ideal solutions. Multiple drive mechanisms involve considerable additional expenditure. On the other hand, the use of universal joints requires that the operator leave his working position each time it is necessary to couple or uncouple the drive mechanisms.

Over a period of a day, this can add up to a substantial amount of lost time, thus reducing the productivity of the operator and his machinery. In addition, the frequent interruptions can be frustrating for the operator and cause him to become irritable and less careful in his work.

From the above discussion, it is clear that previous drive assemblies are not satisfactory in a significant number of situations. Thus, there is a need for a new drive assembly that overcomes the deficiencies of present mechanisms.

The present invention provides a novel drive assembly that can be used conveniently under a variety of drive conditions. The drive assembly of the present invention facilitates coupling and uncoupling. The coupling can be accomplished automatically, without hand labor. The drive assembly of the invention can be adapted to different drive line combinations easily.

The drive assembly of the invention is simple in design and can be produced relatively inexpensively. The assembly can be fabricated from commercially available materials and components employing conventional metal working manufacturing techniques and procedures.

The drive assembly can be installed quickly and easily without special tools. The installation can be accomplished by persons with limited mechanical skills or experiences.

The drive assembly is durable in construction and has a long useful life. Little, if any, maintenance is required to keep the drive assembly in operating condition.

These and other advantages and benefits of the novel drive assembly of the present invention will be apparent from the following description and accompanying drawings in which:

FIG. 1 is a view in perspective of one form of the drive assembly of the invention employed with rod weeder mechanism mounted on plowing apparatus;

FIG. 2 is an enlarged fragmentary back view of the drive assembly shown in FIG. 1 moving into a locked position;

FIG. 3 is a greatly enlarged side view of the drive assembly shown in FIG. 2; and FIG. 4 is a sectional view of the drive assembly separated from an adjoining rod section.

As shown in the drawings, one form of the novel drive assembly 11 of the present invention is employed with rod weeder mechanism 12 on plowing apparatus 13 that is drawn by tractor 14. The plowing apparatus 13 includes outrigger sections 16 and 17. Outrigger section 16 is shown raised off the ground, a position in which both outrigger sections 16 and 17 normally would be placed for transport through a gate or along a roadway.

The rod weeder mechanism 12 is attached to the plowing apparatus 13 through suitable brackets 18. One end of each bracket 18 is secured to the plow hangers 19 adjacent the chisels or spades 20. The opposite ends of the brackets 18 include bearings 21 through which shaft or rod sections 22, 23 and 24 extend.

One form of the novel drive assembly 11 of the present invention includes first and second shaft ends 25 and 26. The shaft ends 25 and 26 normally are disposed closely adjacent to one another and aligned axially in an end to end relationship.

The drive assembly 11 includes a connector portion 27 that operatively connects adjacent shaft ends 25 and 26. The connector portion 27 includes a resilient section 28 that extends between end sections 29 and 30. Each end section 29 and 30 includes an axial opening 32. Advantageously, the resilient section 28 is a coil spring section 31 as shown in the drawings. Adjacent end 25 is affixed within the first end section opening 32. Likewise, the end 26 is affixed within second end section opening 32.

Drive assembly 11 also may include one or more coupling portions 35 to facilitate interconnection of pivoting outrigger sections. The coupling portions 35 each include a guide section 36. The guide section 36 includes an enlarged end section 37. Advantageously, the enlarged end section 37 has a generally conical configuration. The guide section 36 also includes an axial bore 38 extending therethrough. The bore 38 is affixed at the tubular end 39 of the guide to a rod end 40. The opposite end 42 of the bore 38 adjacent the conical section 37 slidably engages a rod point 43. The axial bore 38 through the guide section 36 has a cross section substantially the same as the cross-sectional configuration of the rod point 43, but slightly larger. Preferably, as shown, a connector portion 27 is disposed adjacent each rod point 43 of a coupling portion 35.

To achieve a positive interconnection of the adjacent shaft and rod sections of the connector and coupling portions, means are provided to fix the respective shafts and rod ends against rotation with respect to adjacent components. As shown in the drawings, this may be accomplished by employing shaft and rod sections with cross sections having a plurality of sides. While shaft and rod sections are illustrated which are square in cross section, other multi-sided configurations such as triangles, hexagons and the like may be utilized. If the rod and shaft sections being connected or coupled have round cross sections, other means such as keys may be employed to achieve the desired positive interconnection.

In the installation of the drive assembly 11 of the present invention as shown in the drawings, the rod sections 22, 23 and 24 of the rod weeder mechanism 12 are mounted on the back of the plowing apparatus 13 in the conventional manner. First, the rod support brackets 18 are attached to the plow hangers 19 with the bearings 21 extending rearwardly therefrom. Next, the rod sections are inserted through the bearings 21 in an end to end relationship with their ends adjacent to one another.

To provide flexibility between adjacent rod sections, connector portions 27 may be connected therebetween. First, end section 29 is inserted onto the shaft end 25 and secured thereto. This may be accomplished through suitable fastening means such as welding, a bolt or the like. Thereafter, the adjacent end 26 of the adjoining rod section is slid into the other end section 30 and secured thereto.

If the rod weeder apparatus 12 includes one or more pivoting outrigger sections 16 and 17, coupling portions 35 are installed between the pivoting rod sections to facilitate interconnection therebetween. A guide section 36 is affixed to one rod end 40. Similarly, a rod point 43 is slid into the enlarged end section 37 of guide 36 and the opposite end thereof affixed to the free end section of a connector portion 27.

A drive mechanism for the rod weeder 12 such as one or more ground drive wheels 45 are operatively connected to the rod assembly through appropriate linkages (not shown). The plowing apparatus 13 then is hitched to a tractor 14 and the machinery is ready for use in the same way that conventional rod weeding/plowing combinations normally are used. As the machinery is drawn over a field, the plow spades 20 move through the upper layer of the soil loosening it. The rotating rods 22, 23 and 24 follow through loosened soil, separating the weeds therefrom. Since connector portions 27 provide flexibility of adjoining rod sections, the rods accommodate unevenness of the terrain easily.

When the field has been cultivated completely and it is desired to move the machinery to another field, the operator raises the outrigger sections 16 and 17 by activating controls at the driver's position. These controls may activate hydraulic cylinders (not shown) that raise each of the outriggers 16 and 17 into a substantially vertical position. This action reduces the overall width of the machinery to about that of the central section 15. The machinery now can pass through a gate easily and into the next field to be cultivated.

During the raising of the outrigger sections 16 and 17, the rod sections separate at the coupling portions 35. Rod point 43 withdraws from the bore 38 of the guide section 36 of the coupling portion. Since the guide section 36 is affixed to the end 40 of the rod 22, the guide section remains attached to the rod 22 during the pivoting of the outrigger sections 16 and 17. Likewise, the rod point 43 remains attached to the connector portion 27 which in turn is affixed to rod 23.

After the machinery has passed into the next field, the machinery is returned to an operating position by lowering the outrigger sections 16 and 17 to a horizontal alignment again. As the outrigger sections approach a horizontal position, the rod sections 22, 23 and 24 are reconnected automatically. The rod points 43 slide into the bores 38 of the guide sections 36. The reconnection is accomplished easily and without binding between the rod points and the bores 38 because of the flexibility of the connector portions.

Once the rod points 43 are securely positioned within bores 38, the rod sections 22, 23 and 24 are operatively interconnected again and the machinery can be drawn over a new field with the ground wheels driving the rod sections. The same sequence is repeated each time it is necessary to reduce the width of the machinery. The outrigger sections 16 and 17 are raised or lowered as required and the separation and reconnection of the coupling portions is accomplished without the operator leaving his normal operating station.

While the above description and the drawings illustrate the use of the drive assembly 11 on a rod weeder mechanism, the drive assembly also may be employed with other in-line or pivoting drive assemblies such as augers, tractor PTO couplings and the like.

The above description and the accompanying drawings show that the present invention provides a novel drive assembly that can be employed successfully in a variety of different drive conditions. The drive assembly of the invention is simple in design and relatively inexpensive. The drive assembly also facilitates automatic coupling and uncoupling so the coupling can be controlled from remote locations conveniently.

The drive assembly of the present invention can be fabricated from commercially available materials and components employing conventional metal working techniques. The drive assembly is durable in construction and has a long useful life without maintenance. The assembly can be installed quickly and easily by workmen with a minimum of skill and experience.

It will be apparent that various modifications can be made in the particular drive assembly described in detail above and shown in the drawings within the scope of the invention. The size, configuration and arrangement of components can be difficult to meet specific requirements. Also, other resilient section and guide section designs can be employed provided the functioning and operation of the drive assembly are not adversely affected. Therefore, the scope of the invention is to be limited only by the following claims.

What is claimed is:

1. A separable drive assembly including first and second shaft sections, said shaft sections being normally aligned axially in an end to end relationship and being pivotally separable from one another, a coupling portion selectively operatively connecting adjacent ends of said first and second shaft sections, said coupling portion including a guide section including an axial bore therethrough, said adjacent end of said first shaft section engaging and being affixed within one end of said axial bore, said guide section including an enlarged generally conical end section at an opposite end of said axial bore from said first shaft section, an adjacent end of said second shaft section being capable of slidable engagement with said conical end section and said axial bore within said guide section, said axial bore adjacent said conical section having a cross section with a plurality of sides substantially the same as the cross-sectional configuration of said second shaft section but slightly larger to fix said second shaft section against rotation with respect to said coupling portion, a connector portion disposed along the length of said second shaft section adjacent said coupling portion, said connector portion including a resilient section including a coil spring and end sections with axial openings in which ends of said second shaft section are affixed; whereby moving said adjacent first and second shaft section ends toward each other will cause the end of said second shaft section to slidably engage said axial bore within said guide section of said coupling portion to operatively connect said first and second shaft sections in a drive assembly.

2. A drive assembly according to claim 1 wherein said drive assembly is part of a rod weeding apparatus.

3. A drive assembly according to claim 2 wherein said rod weeding apparatus includes a rod drive means.

* * * * *